United States Patent
Pickerd

(10) Patent No.: US 12,442,852 B2
(45) Date of Patent: Oct. 14, 2025

(54) TUNING A DEVICE UNDER TEST USING PARALLEL PIPELINE MACHINE LEARNING ASSISTANCE

(71) Applicant: Tektronix, Inc., Beaverton, OR (US)

(72) Inventor: John J. Pickerd, Hillsboro, OR (US)

(73) Assignee: Tektronix, Inc., Beaverton, OR (US)

( * ) Notice: Subject to any disclaimer, the term of this patent is extended or adjusted under 35 U.S.C. 154(b) by 396 days.

(21) Appl. No.: 18/126,342

(22) Filed: Mar. 24, 2023

(65) Prior Publication Data

US 2023/0314498 A1 Oct. 5, 2023

Related U.S. Application Data

(60) Provisional application No. 63/325,373, filed on Mar. 30, 2022.

(51) Int. Cl.
*G01R 31/28* (2006.01)
*G01R 31/3183* (2006.01)
*G01R 31/319* (2006.01)

(52) U.S. Cl.
CPC .... *G01R 31/2834* (2013.01); *G01R 31/318307* (2013.01); *G01R 31/31908* (2013.01); *G01R 31/2862* (2013.01)

(58) Field of Classification Search
CPC ............ G01R 31/2834; G01R 31/2862; G01R 31/286; G01R 31/2855; G01R 31/2868;
(Continued)

(56) References Cited

U.S. PATENT DOCUMENTS 5,272,723 A 12/1993 Kimoto
5,397,981 A 3/1995 Wiggers
(Continued)

FOREIGN PATENT DOCUMENTS

CN 107342810 11/2019
EP 2743710 9/2018
(Continued)

OTHER PUBLICATIONS

Varughese, Siddarth, et al., Accelerating Assessments of Optical Components Using Machine Learning: TDECQ as Demonstrated Example, Journal of Lightwave Technology, Jan. 1, 2021, pp. 64-72, vol. 39, No. 1, IEEE.
(Continued)

*Primary Examiner* — Manuel L Barbee
(74) *Attorney, Agent, or Firm* — Miller Nash LLP; Andrew J. Harrington

(57) ABSTRACT

A test system has ovens configured to hold devices under test (DUTs), DUT switches, each connected to the DUTs in an oven, splitters, each splitter connected to a DUT switch, an instrument switch connected to one output of each splitter, the other output of each splitter connected to a test instrument, and one or more processors to control the instrument switch to select one of the DUT switches connected to an oven, control the selected DUT switch to connect each DUT in the oven to a channel of the test and measurement instrument, use machine learning to tune the DUT to a set of parameters until the DUT passes or fails, repeat the connecting, tuning, and testing of each DUT until all DUTs in an oven have been tested, and repeat the selection and control of the DUT switches until each DUT in each oven has been tuned and tested.

15 Claims, 2 Drawing Sheets

(58) Field of Classification Search
CPC .............. G01R 31/287; G01R 31/2872; G01R 31/2874; G01R 31/2875; G01R 31/307; G01R 31/318; G01R 31/31908
See application file for complete search history.

(56) References Cited

U.S. PATENT DOCUMENTS

| | | | |
|---|---|---|---|
| 5,594,655 | A | 1/1997 | Berchin |
| 6,807,496 | B2 | 10/2004 | Pickerd |
| 7,181,146 | B1 | 2/2007 | Yorks |
| 7,298,463 | B2 | 11/2007 | French |
| 8,583,395 | B2 | 11/2013 | Dybsetter |
| 8,861,578 | B1 | 10/2014 | Lusted |
| 9,059,803 | B2 | 6/2015 | Detofsky |
| 9,130,751 | B2 | 9/2015 | Zivny |
| 9,337,993 | B1 | 5/2016 | Lugthart |
| 9,548,858 | B1 | 1/2017 | Cirit |
| 9,699,009 | B1 | 7/2017 | Ainspan |
| 9,709,605 | B2 | 7/2017 | Alley |
| 10,171,161 | B1 | 1/2019 | Cote |
| 10,209,276 | B2 | 2/2019 | Tan |
| 10,236,982 | B1 | 3/2019 | Zhuge |
| 10,270,527 | B1 | 4/2019 | Mentovich |
| 10,396,897 | B1 | 8/2019 | Malave |
| 10,585,121 | B2 | 3/2020 | Absher |
| 10,727,973 | B1 | 7/2020 | Kumar |
| 10,852,323 | B2 | 12/2020 | Schaefer |
| 10,863,255 | B2 | 12/2020 | Zhang |
| 11,005,697 | B2 | 5/2021 | Liston |
| 11,040,169 | B2 | 6/2021 | Jung |
| 11,095,314 | B2 | 8/2021 | Medard |
| 11,177,986 | B1 | 11/2021 | Ganesan |
| 11,233,561 | B1 | 1/2022 | O'Shea |
| 11,237,190 | B2 | 2/2022 | Rule |
| 11,336,378 | B2 | 5/2022 | Buttoni |
| 11,388,081 | B1 | 7/2022 | Sommers |
| 11,476,967 | B2 | 10/2022 | Geng |
| 11,646,863 | B2 | 5/2023 | Balan |
| 11,695,601 | B2 | 7/2023 | Sudhakaran |
| 2002/0063553 | A1 | 5/2002 | Jungerman |
| 2003/0053170 | A1 | 3/2003 | Levinson |
| 2003/0208330 | A1 | 11/2003 | Pickerd |
| 2003/0220753 | A1 | 11/2003 | Pickerd |
| 2004/0032889 | A1 | 2/2004 | Hidaka |
| 2004/0121733 | A1 | 6/2004 | Peng |
| 2004/0131365 | A1 | 7/2004 | Lee |
| 2004/0136422 | A1 | 7/2004 | Mahowald |
| 2004/0165622 | A1 | 8/2004 | Lu |
| 2004/0178786 | A1* | 9/2004 | Yeh .................... G01R 31/2855 324/750.03 |
| 2004/0223544 | A1 | 11/2004 | Upton |
| 2004/0236527 | A1 | 11/2004 | Felps |
| 2005/0222789 | A1 | 10/2005 | West |
| 2005/0246601 | A1 | 11/2005 | Waschura |
| 2005/0249252 | A1 | 11/2005 | Sanchez |
| 2005/0265717 | A1* | 12/2005 | Zhou .................... G01M 99/002 398/9 |
| 2006/0120720 | A1 | 6/2006 | Hauenschild |
| 2008/0126001 | A1 | 5/2008 | Murray |
| 2008/0159737 | A1 | 7/2008 | Noble |
| 2008/0212979 | A1 | 9/2008 | Ota |
| 2009/0040335 | A1 | 2/2009 | Ito |
| 2011/0085793 | A1 | 4/2011 | Oomori |
| 2011/0161738 | A1 | 6/2011 | Zhang |
| 2011/0286506 | A1 | 11/2011 | Libby |
| 2012/0226727 | A1 | 9/2012 | Zivny |
| 2013/0046805 | A1 | 2/2013 | Smith |
| 2014/0093233 | A1 | 4/2014 | Gao |
| 2014/0163914 | A1 | 6/2014 | Alley |
| 2014/0343883 | A1 | 11/2014 | Libby |
| 2015/0003505 | A1 | 1/2015 | Lusted |
| 2015/0055694 | A1 | 2/2015 | Juenemann |
| 2015/0207574 | A1 | 7/2015 | Schoen |
| 2015/0350042 | A1 | 12/2015 | Zivny |
| 2016/0191168 | A1 | 6/2016 | Huang |
| 2016/0328501 | A1 | 11/2016 | Chase |
| 2018/0006721 | A1 | 1/2018 | Ishizaka |
| 2018/0045761 | A1 | 2/2018 | Tan |
| 2018/0074096 | A1 | 3/2018 | Absher |
| 2018/0204117 | A1 | 7/2018 | Brevdo |
| 2018/0219636 | A1 | 8/2018 | Gale |
| 2018/0356655 | A1 | 12/2018 | Welch |
| 2019/0038387 | A1 | 2/2019 | Chu et al. |
| 2019/0278500 | A1 | 9/2019 | Lakshmi |
| 2019/0332941 | A1 | 10/2019 | Towal |
| 2019/0370158 | A1 | 12/2019 | Rivoir |
| 2019/0370631 | A1 | 12/2019 | Fais |
| 2020/0035665 | A1 | 1/2020 | Chuang et al. |
| 2020/0057824 | A1 | 2/2020 | Yeh |
| 2020/0166546 | A1 | 5/2020 | O'Brien |
| 2020/0195353 | A1 | 6/2020 | Ye |
| 2020/0229206 | A1 | 7/2020 | Badic |
| 2020/0313999 | A1 | 10/2020 | Lee |
| 2020/0335029 | A1 | 10/2020 | Gao |
| 2021/0041499 | A1 | 2/2021 | Ghosal |
| 2021/0105548 | A1 | 4/2021 | Ye |
| 2021/0111794 | A1 | 4/2021 | Huang |
| 2021/0160109 | A1 | 5/2021 | Seol |
| 2021/0167864 | A1 | 6/2021 | Razzell |
| 2021/0173010 | A1* | 6/2021 | Hsu ................ G01R 31/318314 |
| 2021/0314081 | A1 | 10/2021 | Shattil |
| 2021/0389373 | A1 | 12/2021 | Pickerd |
| 2021/0390456 | A1 | 12/2021 | Pickerd |
| 2022/0070040 | A1 | 3/2022 | Namgoong |
| 2022/0076715 | A1 | 3/2022 | Lee |
| 2022/0121388 | A1 | 4/2022 | Woo |
| 2022/0155342 | A1* | 5/2022 | Chow .............. G01R 31/31905 |
| 2022/0182139 | A1 | 6/2022 | Zhang |
| 2022/0199126 | A1 | 6/2022 | Lee |
| 2022/0200712 | A1 | 6/2022 | Lillie |
| 2022/0215865 | A1 | 7/2022 | Woo |
| 2022/0236326 | A1 | 7/2022 | Schaefer |
| 2022/0239371 | A1 | 7/2022 | Xu |
| 2022/0247648 | A1 | 8/2022 | Pickerd |
| 2022/0311513 | A1 | 9/2022 | Pickerd |
| 2022/0311514 | A1 | 9/2022 | Smith |
| 2022/0334180 | A1 | 10/2022 | Pickerd |
| 2022/0373597 | A1 | 11/2022 | Agoston |
| 2022/0373598 | A1 | 11/2022 | Tan |
| 2022/0385374 | A1 | 12/2022 | Arikawa |
| 2022/0390515 | A1 | 12/2022 | Pickerd |
| 2022/0393914 | A1 | 12/2022 | Tan |
| 2022/0407595 | A1 | 12/2022 | Varughese |
| 2023/0050162 | A1 | 2/2023 | Tan |
| 2023/0050303 | A1 | 2/2023 | Pickerd |
| 2023/0052588 | A1 | 2/2023 | Sudhakaran |
| 2023/0088409 | A1 | 3/2023 | Parsons |
| 2023/0098379 | A1 | 3/2023 | Smith |
| 2023/0194599 | A1 | 6/2023 | Gilabert |
| 2023/0228803 | A1 | 7/2023 | Sun |
| 2023/0239182 | A1 | 7/2023 | Ikeda |
| 2023/0299862 | A1 | 9/2023 | O'Shea |
| 2023/0306578 | A1 | 9/2023 | Pickerd |

FOREIGN PATENT DOCUMENTS

| | | |
|---|---|---|
| EP | 3936877 | 1/2022 |
| JP | 6560793 | 8/2019 |
| WO | 2021092156 | 5/2021 |
| WO | 2022171645 | 8/2022 |
| WO | 2022189613 | 9/2022 |

OTHER PUBLICATIONS

Varughese, Siddarth, et al., Accelerating TDECQ Assessments using Convolutional Neural Networks, OFC, Mar. 2020, 3 pages, The Optical Society (OSA).

Watts et al., "Performance of Single-Mode Fiber Links Using Electronic Feed-Forward and Decision Feedback Equalizers", 2005, IEEE Photonics Techology Letters, vol. 17, No. 10, pp. 2206-2208 (Year: 2005).

(56) References Cited

OTHER PUBLICATIONS

Echeverri-Chacon et al., "Transmitter and Dispersion Eye Closure Quaternary (TDECQ) and Its Sensitivity to Impairments in PAM4 Waveforms", 2019, Journal of Lightwave Technology, vol. 37, No. 3, pp. 852-860 (Year: 2019).
Wang et al., "Intelligent Constellation Diagram Analyzer Using Convolutional Neural Network-Based Deep Learning," Optics Express, Jul. 24, 2017, vol. 25, No. 15.

* cited by examiner

TUNING A DEVICE UNDER TEST USING PARALLEL PIPELINE MACHINE LEARNING ASSISTANCE

CROSS-REFERENCE TO RELATED APPLICATIONS

This disclosure claims benefit of U.S. Provisional Application No. 63/325,373, titled "OPTICAL TRANSCEIVER TUNING USING PARALLEL PIPELINE MACHINE LEARNING ASSISTANCE," filed on Mar. 30, 2022, the disclosure of which is incorporated herein by reference in its entirety.

TECHNICAL FIELD

This disclosure relates to test and measurement systems, and more particularly to systems and methods for tuning parameters of a device under test (DUT), for example an optical transceiver device.

BACKGROUND

Machine learning techniques can improve the test time for tuning parameters of a device under test (DUT). U.S. patent application Ser. No. 17/701,186, and U.S. patent application Ser. No. 17/701,411, each filed Mar. 22, 2022, the entire contents of which are hereby incorporated by reference into this disclosure, both disclose systems and methods for tuning parameters of DUTs, such as optical transceivers. Those systems and methods can improve the test time for tuning an optical transceiver or other DUTs, for example in a manufacturing environment. Those systems and methods may decrease the optical transceiver tuning parameter test time from a worst-case example of two hours per DUT down to approximately 12 seconds per DUT per temperature, for an optimal tuning parameter set prediction and validation. This represents a very significant speed up compared to the worst-case conventional tuning processes.

However, the DUT tuning processes may include tuning at different temperatures. The time needed to bring the DUT up or down to each desired tuning temperature(s) contributes significant delay. For example, in some tuning processes, each temperature ramp up time is 180 seconds. Furthermore, it may take additional time to load and remove the DUTs into and out of temperature chambers used for testing. Therefore, what is needed is an overall system design and method that can reduce the temperature cycle time, and the switching out of devices in the oven, to virtually zero time.

DETAILED DESCRIPTION

Figure 1:
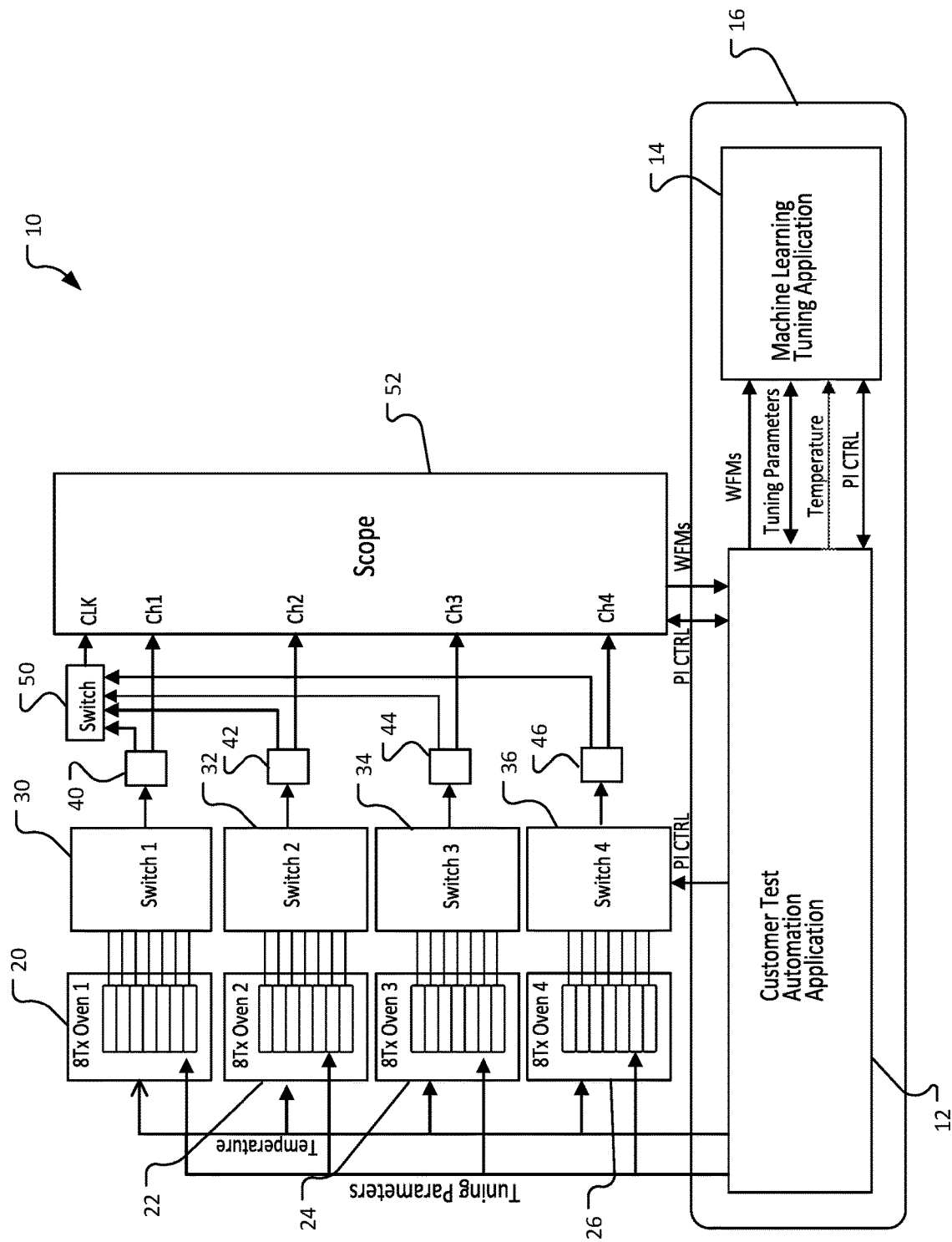
FIG. 1 shows an embodiment of a test system using pipelining.

Embodiments of the disclosure address issues in reducing temperature cycle time in testing DUTs, combined with a machine learning (ML) system to speed up the overall time to test DUTs. The following discussion will use the example of DUTs being an optical transmitters or transceivers that need parameters to be tuned at multiple different temperatures. The embodiments generally provide systems and methods in which the total tuning time only depends on one scope channel and the amount of time machine learning takes per transmitter. These systems and methods then result in the ability to output a fully tuned transmitter, tuned at multiple temperatures. In one embodiment, a system using three temperatures can run at an uninterrupted rate of 36 seconds for each transmitter. This represents a two hundred times speed up of the two-hour tuning time for the worst-case example of conventional tuning processes.

Embodiments of the disclosure use novel techniques for pipelining the processing of data, use a novel machine learning element, and use novel techniques for using the serial sequencing of a different instrument, such as an oscilloscope ("scope"), channel for a different temperature chamber, or oven. Embodiments of the disclosure generally do not parallelize the scope channel acquisitions between channels to obtain the 200× speed up factor. Rather, embodiments of the disclosure generally process the channels serially one channel at a time. This avoids the very expensive and time-consuming process of redesigning oscilloscope hardware and software to accommodate parallel channel processing because parallel channel processing is not needed. Another advantage of the overall test configuration is that it minimizes the layers of optical, or other, switches needed in the signal path between the DUT and the scope to be only one layer. This offers an advantage of reducing costs and improving signal integrity compared to trying to process four waveforms input in parallel into four scope channels at the same time as some current manufacturing systems do.

The embodiments employ a parallel pipeline architecture. The number of pipelines equals the number of ovens, or temperature chambers, used. The number of pipelines also corresponds to the number of switches connected to the DUTs in each oven to cycle through the DUTs, the dimensions of the switch that selects between the switches connected to each oven, and the number of scope or test instrument channels. Another dimension is the number of DUTs per oven. Each of the oven DUT switches, those that connect to the DUTs in the oven, will have a number of switches equal to the number of DUTs in the oven.

The following discussion uses a particular number of ovens, DUT switches, a particular dimension of the instrument switch, and a particular number of channels on a test and measurement instrument. These numbers are for ease of discussion and understanding and are in no way intended to limit the number of any component in the system.

The embodiment of FIG. 1 shows a pipeline system 10 under the control of a customer test automation application 12 and a machine learning system 14. These may both reside on the same computing device 16, which may have one or more processors, or may be distributed among multiple computing devices each with one or more processors. The customer test automation application 12 may control the switches through a programmatic interface (PI). Similarly, the test automation application may interact with the instrument and the machine learning system also through a programmatic interface.

One example embodiment uses four ovens, 20, 22, 24 and 26. This translates to four pipelines, four DUT switches, 30, 32, 34, and 36, and a 4×1 instrument switch 50 that connects each DUT switch to the scope clock input, CLK. The Tx, transmitter, must be tuned for three or more temperatures, and each temperature takes 180 seconds to ramp up. To take advantage of the parallel architecture, the embodiments of the disclosure overlap the ramp up times of the temperature change in each oven. The end result is the oven ramp-up times go to a virtual time of zero seconds in the overall tuning process timeline for system 10. Likewise, the time to take transmitters in and out of the oven also goes to virtually zero seconds. Each pipeline also contains serial operation tasks.

In the embodiment, each oven contains eight transmitters to be brought up to temperature. The DUTs in this embodiment comprise optical transmitters, but any type of tunable DUT, optical or electronic may use this system. "Electronic" DUTs are those DUTs that are not optical devices. Having eight transmitters per oven results in each DUT switch 30, 32, 34, and 36 being 8×1 switches. In the case of optical transmitters, these are optical switches.

Even though the eight transmitters in one oven are heated in parallel, they shall be tuned one at a time serially into one instrument channel. This avoids costly redesigns of the instrument to allow for parallel processing of all channels.

Each DUT switch may connect to a splitter that splits the signal between the instrument switch 50 and the channel on the instrument 52. The splitters 40, 42, 44, and 46, pick off some of the signal from each of four DUT switch outputs to be applied to the 4×1 instrument switch that outputs into the CLK input of the sampling scope. This is for the purpose of clock recovery for the scope to acquire the signal on each channel.

The instrument switch 50 selects the appropriate 8×1 DUT switch output to tune the transmitters in the oven that has completed ramping up to the correct temperatures. The selected 8×1 DUT switch will cycle through all the transmitters in the oven.

In operation, the test and measurement instrument acquires the waveforms from the transmitters. One of the aspects of this system is that only one channel is processed at a time in serial fashion. The channels are not processed in parallel. This is because only one channel at a time will be connected to DUTs that are ramped up to the correct temperature. For example, when oven 20 is up to temperature then channel 1 will acquire waveforms from each of the 8 transmitters in series in that oven at that temperature. The user test automation application 12 will pass these waveforms to the Tektronix Optical Tuning application 14 for training the deep learning network and for predicting optimal tuning parameters and for computing TDECQ validation of the resulting tuning. This means that the time to tune a transmitter depends only on the acquisition time of the oscilloscope, and on the DSP processing time of the optical tuning applications. The Tektronix Optical Tuning application, or machine learning system, uses machine learning to provide tuning parameters for the optical transceivers based upon the waveforms received from the DUTs.

The customer application 12 acts as the primary controller of the overall system. It has responsibility for timing and sequencing of all the tasks for all four of the parallel pipelines. These tasks include setting the temperatures of the ovens. The controller may pause while an operator or robot loads and unloads transmitters into and out of the oven and may control the robot if one is used. The tasks also include loading tuning parameters into the transmitters and controlling an oscilloscope to acquire waveforms from the transmitters. The controller also collects the waveforms and the parameters and sends them to the Optical Tuning Application to train deep learning networks, to receive back predictions of optimal tuning parameters, and to receive measurements on the waveforms for validation of tuning. The control of the system is embodied in one or more processors configured to execute code to operate the various aspects of the system. The one or more processors may be located on the test automation application 12 running on a separate computing device from the instrument and the machine learning system. Each of those may have their own processors, they may all be contained in one system, or any mix in between.

The controller also controls the 8×1 DUT switches 30-36 to select from which transmitter in an oven to collect a waveform, and controls the 4×1 instrument switch 50 to select the correct output of the 8×1 switches to apply into the clock recovery input CLK of the scope. The controller also controls the instrument 52 to acquire the waveforms from the correct channel of the instrument depending on which channel has an oven that is currently ramped up to the temperature for the tuning operation. As will be seen with reference to FIG. 2, an unused period of time, in this embodiment 96 seconds, exists between the ramp up of the temperature of each oven and the tuning interval for the transmitters in that oven at that temperature.

As mentioned above, the tuning process employs a novel machine learning system that undergoes training to associate a set of tuning parameters for each DUT based upon the waveforms. The process may iterate until the DUTs have been determined to either pass or fail. The machine learning system accelerates the cycle of tuning the DUTs and then testing them to determine operational pass or fail. The testing process involves a measurement process that also relies upon the machine learning system. This system has demonstrated that it reduces the tuning interval to 12 seconds per transmitter per temperature. With the ramp up time period for each oven essentially reduced to zero, the system can achieve a tuning interval of 36 seconds per transmitter across three temperatures.

Figure 2:
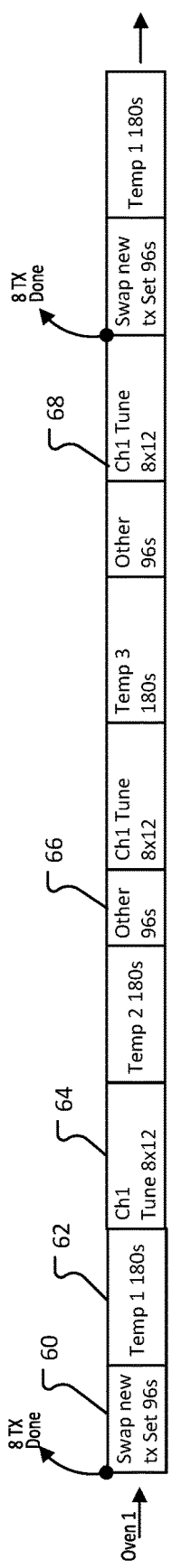
FIG. 2 shows a pipeline diagram for an embodiment of a test system.
Figure 3:
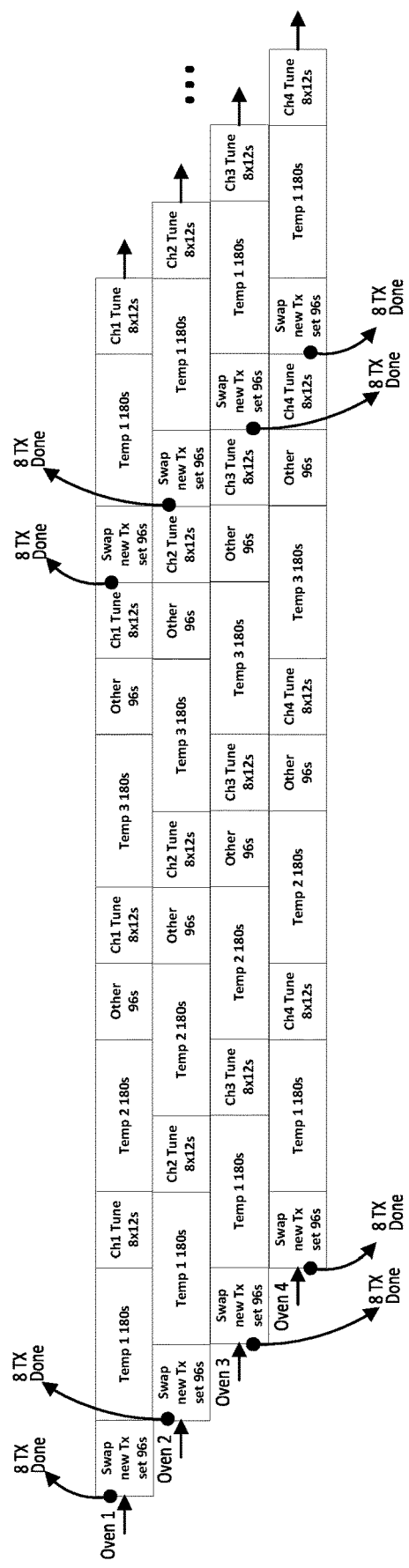
FIG. 3 shows how four pipelines are aligned in timing.

FIG. 2 shows one of the pipelines, and FIG. 3 shows the four parallel pipelines, each sourced by an oven. In FIG. 2. Oven 1, having tuned a set of transmitters, receives a new set at 60. At 62, the oven ramps up to the first temperature, which takes 180 seconds. The transmitters then undergo tuning and testing using the machine learning system at 64, which takes 12 seconds per transmitter, or 96 seconds for the set of 8 to be tested at that temperature. Upon completion of tuning and testing, the oven then ramps up to the second temperature. There is an unused time interval of 96 seconds at 66. The process then continues with tuning and testing, ramping up to the third temperature, another unused time interval of 96 seconds, then the final tuning and testing at 68. FIG. 2 only shows a view of one oven and one pipeline. The efficiency and advantages of the pipelining approach result from combining multiple pipelines as shown in FIG. 3.

In FIG. 3, one can see that the four ovens source the parallel pipelines. The top pipeline is the pipeline shown in FIG. 2. More pipelines could be added with the addition of more ovens. The process loads the second oven upon completion of the loading of the first oven. As stated above, the tuning time for each transmitter takes 12 seconds. This breaks down as 2 seconds per acquisition for four waveforms, 1 second for the machine learning DSP to predict tuning parameters, 2 seconds to compute TDECQ (transmitter dispersion eye closure quaternary) the measurement used to determine pass/fail, and a 1 second margin for a total of 12 seconds per transmitter. Each testing and tuning block computes while the other three ovens are in different phases of ramping up to temperature, or having a set of DUTs unloaded or loaded.

After each testing and tuning block there is another block for that pipeline to ramp up to the next temperature. After each pipeline has computed tuning for each temperature then the 8 transmitters in that oven are ready to unload, and a new set of 8 transmitters are loaded to repeat the cycle. The unused time intervals allow for the system to perform other operations that may not be covered by the optical tuning algorithm. The pipeline sequencing times may be adjusted if needed.

The parallel pipelines as shown in FIG. 3 provide the system to output fully tuned transmitters at an average ideal rate of one transmitter every 36 seconds. The tune times given represent the ideal, assuming machine learning predictions are 100% accurate. The 96 seconds overlap margins can cover some or all of any inaccuracy. Even with these built in intervals, the actual result is still expected to be many times faster than current methods used on the manufacturing lines.

As discussed above, the embodiments may have been discussed with regard to tuning optical transmitters, but the pipelining architecture and temperature testing could be applied to many different types of DUTs, optical or electronic.

In this manner, the embodiments pair the optical tuning machine learning systems mentioned with the novel parallel pipeline and instrument channel switching architecture to make the cycle times of the ovens go to virtual zero. This results in a machine learning assisted speed up of predicting optimized tuning parameters. The embodiments achieve this tuning speed improvement of almost two hundred times, without the need to use parallel instrument acquisition channels.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable, or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

EXAMPLES

Illustrative examples of the disclosed technologies are provided below. An embodiment of the technologies may include one or more, and any combination of, the examples described below.

Example 1 is a test system, comprising: ovens, each oven configured to hold a number of devices under test (DUTs); DUT switches, each switch connected to each of the DUTs in a respective oven; splitters, each splitter connected to a respective DUT switch, each splitter having two outputs; an instrument switch connected to one output of each splitter, the other output of each splitter connected to a channel of a test instrument; and one or more processors configured to execute code that causes the one or more processors to: control the instrument switch to select one of the DUT switches connected to an oven; control the selected DUT switch to serially connect each DUT in the oven to a same channel of the test and measurement instrument; as each DUT is connected, use machine learning to tune the DUT to a set of parameters until the DUT passes or fails operational testing; repeat the connecting, tuning, and testing of each DUT until all DUTs in an oven have been tested; and repeat the selection and control of the DUT switches until each DUT in each oven has been tuned and tested.

Example 2 is the test system of Example 1, wherein a number of DUT switches corresponds to a number of ovens.

Example 3 is the test system of either of Examples 1 or 2, wherein the instrument switch has a dimension corresponding to the number of DUT switches.

Example 4 is the test system of any of Examples 1 through 3, wherein the code that causes the one or more processors to control the instrument switch to select one of the DUT switches comprises code to control the instrument switch to select one of the DUT switches and connect each selected DUT switch to a dedicated channel of the test instrument.

Example 5 is the test system of any of Examples 1 through 4, wherein the one or more processors are further configured to control the ovens to cause the ovens to cycle through multiple temperatures, and the one or more processors repeat the control of the instrument switch and the DUT switches for each temperature.

Example 6 is the test system of any of Examples 1 through 5, wherein the one or more processors are further configured to control a robot to unload and reload the ovens with DUTs.

Example 7 is the test control system of any of Examples 1 through 6, wherein the DUTs comprise one of either electronic devices or optical devices.

Example 8 is the test control system of any of Examples 1 through 7, wherein the code that causes the one or more processors to use machine learning comprises code to cause the one or more processors to: receive waveforms from the DUT through the instrument; and apply machine learning to analyze the waveform and provide tuning parameters to the DUT.

Example 9 is a method of testing devices under test, comprising: performing a testing process comprising: setting a selected oven from a plurality of ovens containing a set of devices under test (DUT) to a first temperature; connecting a selected DUT switch connected to the DUTs in the selected oven to a selected channel of an instrument; controlling the DUT switch to serially connect each DUT in the selected oven to tune and test each DUT in the selected oven using a machine learning system; and repeating the connecting and controlling as needed for subsequent temperatures; and repeating the testing process for each of the plurality of ovens, such that each subsequent oven in the process is set to the first temperature after a previous oven starts heating up to the first temperature.

Example 10 is the method of Example 9, wherein connecting the selected DUT switch to the selected channel of the instrument comprises employing an instrument switch connected between the instrument and a plurality of DUT switches, each DUT switch corresponding to one of the plurality of ovens.

Example 11 is the method of Example 10, further comprising splitting a signal from the selected DUT switch between the selected channel of the instrument and a clock input on the instrument and recovering a clock signal for the instrument from the split signal.

Example 12 is the method of any of Examples 9 through 11, wherein connecting the selected DUT switch to the selected channel of the instrument comprises connecting a DUT switch for each oven to a different channel of the instrument.

Example 13 is the method of any of Examples 9 through 12, further comprising: instructing an operator or a machine to remove the DUTs from each oven after the oven has cycled through any subsequent temperatures; and instructing the operator or the machine to load a new set of DUTs into the oven.

Example 14 is the method of any of Examples 9 through 13, wherein the DUTs comprise one of either optical devices or electronic devices.

Example 15 is the method of any of Examples 9 through 14, wherein using the machine learning system comprises: receiving waveforms from each DUT; and applying machine learning to the waveforms to produce tuning parameters for the DUT.

The previously described versions of the disclosed subject matter have many advantages that were either described or would be apparent to a person of ordinary skill. Even so, these advantages or features are not required in all versions of the disclosed apparatus, systems, or methods.

Although specific examples of the invention have been illustrated and described for purposes of illustration, it will be understood that various modifications may be made without departing from the spirit and scope of the invention. Accordingly, the invention should not be limited except as by the appended claims.

I claim:

1. A test system, comprising:
ovens, each oven configured to hold a number of devices under test (DUTs);
DUT switches, each switch connected to each of the DUTs in a respective oven;
splitters, each splitter connected to a respective DUT switch, each splitter having two outputs;
an instrument switch connected to one output of each splitter, the other output of each splitter connected to a channel of a test instrument; and
one or more processors configured to execute code that causes the one or more processors to:
control the instrument switch to select one of the DUT switches connected to an oven;
control the selected DUT switch to serially connect each DUT in the oven to a same channel of the test and measurement instrument;
as each DUT is connected, use machine learning to tune the DUT to a set of parameters until the DUT passes or fails operational testing;
repeat the connecting, tuning, and testing of each DUT until all DUTs in an oven have been tested; and
repeat the selection and control of the DUT switches until each DUT in each oven has been tuned and tested.

2. The test system as claimed in claim 1, wherein a number of DUT switches corresponds to a number of ovens.

3. The test system as claimed in claim 1, wherein the instrument switch has a dimension corresponding to the number of DUT switches.

4. The test system as claimed in claim 1, wherein the code that causes the one or more processors to control the instrument switch to select one of the DUT switches comprises code to control the instrument switch to select one of the DUT switches and connect each selected DUT switch to a dedicated channel of the test instrument.

5. The test system as claimed in claim 1, wherein the one or more processors are further configured to control the ovens to cause the ovens to cycle through multiple temperatures, and the one or more processors repeat the control of the instrument switch and the DUT switches for each temperature.

6. The test system as claimed in claim 1, wherein the one or more processors are further configured to control a robot to unload and reload the ovens with DUTs.

7. The test control system as claimed in claim 1, wherein the DUTs comprise one of either electronic devices or optical devices.

8. The test control system as claimed in claim 1, wherein the code that causes the one or more processors to use machine learning comprises code to cause the one or more processors to:
receive waveforms from the DUT through the instrument; and
apply machine learning to analyze the waveforms and provide tuning parameters to the DUT.

9. A method of testing devices under test, comprising:
performing a testing process comprising:
- setting a selected oven from a plurality of ovens containing a set of devices under test (DUT) to a first temperature;
- connecting a selected DUT switch connected to the DUTs in the selected oven to a selected channel of an instrument;
- controlling the DUT switch to serially connect each DUT in the selected oven to tune and test each DUT in the selected oven using a machine learning system; and
- repeating the connecting and controlling as needed for subsequent temperatures; and repeating the testing process for each of the plurality of ovens, such that each subsequent oven in the process is set to the first temperature after a previous oven starts heating up to the first temperature.

10. The method as claimed in claim 9, wherein connecting the selected DUT switch to the selected channel of the instrument comprises employing an instrument switch connected between the instrument and a plurality of DUT switches, each DUT switch corresponding to one of the plurality of ovens.

11. The method as claimed in claim 10, further comprising splitting a signal from the selected DUT switch between the selected channel of the instrument and a clock input on the instrument and recovering a clock signal for the instrument from the split signal.

12. The method as claimed in claim 9, wherein connecting the selected DUT switch to the selected channel of the instrument comprises connecting a DUT switch for each oven to a different channel of the instrument.

13. The method as claimed in claim 9, further comprising:
- instructing an operator or a machine to remove the DUTs from an oven after the oven has cycled through any subsequent temperatures; and
- instructing the operator or the machine to load a new set of DUTs into the oven.

14. The method as claimed in claim 9, wherein the DUTs comprise one of either optical devices or electronic devices.

15. The method as claimed in claim 9, wherein using the machine learning system comprises:
- receiving waveforms from each DUT; and
- applying machine learning to the waveforms to produce tuning parameters for the DUT.

* * * * *